United States Patent
Ach et al.

(10) Patent No.: US 9,895,751 B2
(45) Date of Patent: Feb. 20, 2018

(54) CUTTING TOOL AND METHOD FOR PRODUCING A CUTTING TOOL

(71) Applicant: Kennametal Inc., Latrobe, PA (US)

(72) Inventors: Eduard Ach, Mossbach (DE); Juergen Schwaegerl, Vohenstrauss (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 14/896,264

(22) PCT Filed: Jun. 3, 2014

(86) PCT No.: PCT/EP2014/001488
§ 371 (c)(1),
(2) Date: Dec. 4, 2015

(87) PCT Pub. No.: WO2014/195009
PCT Pub. Date: Dec. 11, 2014

(65) Prior Publication Data
US 2016/0144437 A1 May 26, 2016

(30) Foreign Application Priority Data

Jun. 4, 2013 (DE) .......................... 10 2013 210 355

(51) Int. Cl.
*B23B 51/02* (2006.01)
*B23B 51/06* (2006.01)
(Continued)

(52) U.S. Cl.
CPC ................ *B23B 51/06* (2013.01); *B22F 3/10* (2013.01); *B22F 7/08* (2013.01); *B23B 51/02* (2013.01);
(Continued)

(58) Field of Classification Search
CPC ..... B23B 51/02; B23B 51/06; B23B 2222/28; B23B 2231/0244; B23B 2231/0208;
(Continued)

(56) References Cited

U.S. PATENT DOCUMENTS 3,320,833 A  5/1967  Andreasson
3,370,489 A  * 2/1968  Andreasson ......... B23D 77/006
                                                    407/11
(Continued)

FOREIGN PATENT DOCUMENTS

CN       101460273 A     6/2009
DE     102005014337 A1   8/2006
(Continued)

OTHER PUBLICATIONS

International Search Report for corresponding PCT application PCT/EP2014/001488, dated Oct. 13, 2014, 3 pages.
(Continued)

*Primary Examiner* — Daniel Howell
*Assistant Examiner* — Chwen-Wei Su
(74) *Attorney, Agent, or Firm* — Matthew S. Bedsole

(57) ABSTRACT

The cutting tool (1), especially drill or milling cutter, comprises a base (3) which extends in an axial direction (2) and has an outer shell (14) with at least one interior recess (18) that extends in the axial direction (2), a supporting structure (16) having at least one separating piece (26) which separates a plurality of recesses (18) from each other being formed in the supporting structure. The cutting tool (1) is particularly a solid hard-metal tool. The supporting structure (16) ensures an efficient use of material.

10 Claims, 1 Drawing Sheet

(51) Int. Cl.
  *B23C 5/28* (2006.01)
  *B23P 15/32* (2006.01)
  *B22F 3/10* (2006.01)
  *B22F 7/08* (2006.01)
  *B23C 5/10* (2006.01)
  *B22F 5/00* (2006.01)

(52) U.S. Cl.
  CPC .................. *B23C 5/10* (2013.01); *B23C 5/28* (2013.01); *B23P 15/32* (2013.01); *B22F 2003/1042* (2013.01); *B22F 2005/001* (2013.01); *B22F 2998/10* (2013.01); *B23B 2222/28* (2013.01); *B23B 2231/0208* (2013.01); *B23B 2231/0244* (2013.01); *B23B 2251/62* (2013.01); *B23C 2222/28* (2013.01); *Y10T 408/455* (2015.01); *Y10T 408/907* (2015.01)

(58) Field of Classification Search
  CPC ............... Y10T 408/45; Y10T 408/455; Y10T 408/907; B23P 15/32
  USPC ...................................... 76/108.1, 108.6, 115
  See application file for complete search history.

(56) References Cited

U.S. PATENT DOCUMENTS

| | | | | |
|---|---|---|---|---|
| 4,268,197 | A | * | 5/1981 | Burgsmuller ....... B23B 51/0486 408/57 |
| 5,820,313 | A | * | 10/1998 | Weber ................. B23D 77/042 408/226 |
| 6,116,825 | A | * | 9/2000 | Kammermeier ........ B23B 51/06 279/20 |
| 7,226,254 | B2 | * | 6/2007 | Friedrichs ............. B23B 31/005 408/226 |
| 2008/0260479 | A1 | | 10/2008 | Kammermeier |
| 2009/0123244 | A1 | * | 5/2009 | Buettiker ............ B23B 31/1107 408/233 |
| 2010/0086373 | A1 | * | 4/2010 | Kleiner ................ B23D 77/006 408/1 R |
| 2010/0242696 | A1 | | 9/2010 | Digernes |
| 2010/0272531 | A1 | | 10/2010 | Shavit |
| 2010/0301569 | A1 | * | 12/2010 | Rohr, Jr. ............... B23B 31/201 279/102 |
| 2012/0163931 | A1 | | 6/2012 | Friedrichs |

FOREIGN PATENT DOCUMENTS

| | | |
|---|---|---|
| EP | 0186067 A2 | 7/1986 |
| EP | 0186067 B1 | 10/1989 |
| EP | 2527065 A1 | 11/2012 |

OTHER PUBLICATIONS

Nov. 28, 2016 First office action.
Aug. 10, 2017 Second Office Action.

\* cited by examiner

CUTTING TOOL AND METHOD FOR PRODUCING A CUTTING TOOL

CROSS REFERENCE TO PRIORITY APPLICATIONS

This application is a U.S. National Phase of PCT/EP2014/001488, filed Jun. 3, 2014, which claims the benefit of German Application No. 10 2013 210 355.7, filed Jun. 4, 2013, each of which are incorporated by reference in their entireties.

BACKGROUND OF THE INVENTION

The invention relates to a cutting tool, in particular a drill, having a base which extends in an axial direction and has an outer shell having at least one interior recess that extends in the axial direction. The invention further relates to a method for producing such a cutting tool.

Cutting tools, in particular drills, typically have a clamping shaft extending in the axial direction to which a typically slotted cutting part connects which extends up to a front tool tip, in particular to a drill bit. In the case of such cutting tools, which are also referred to as shaft tools, recesses are often formed in the interior of the base body, in particular for coolant, as can be seen in EP 0 843 609 B1 or WO 03/024661 A1, for example.

In what are referred to as solid carbide drills, a monolithic base body is formed as a sintered body. The manufacturing process involves first making a base body by compression from a metal powder as sintering material, for example, which is then sintered. U.S. Pat. No. 7,226,254 B2 discloses a sintered base body in which, to save sintering material, a central recess is made in the base body in the area of the clamping shaft prior to sintering said base body. The sintering material thus saved is used for manufacturing additional tools.

Object of the Invention

Based on this, the invention is based on providing a cutting tool, in particular a solid carbide tool, as well as a method for its manufacture, in which efficient use of materials is ensured.

Solution of the Problem

The problem is solved according to the invention by a cutting tool having the features of claim 1. The cutting tool is designed as a drill or milling tool and has a base body preferably of carbide steel extending in the axial direction having a recess encased by a solid outer shell extending in the axial direction. The base body is usually formed of a clamping shaft and an adjoining cutting element. The cutting element is preferably grooved and has a tool tip at the end as part of the base body. Basically it is also possible for an exchangeable tool tip to be used. However, for solid carbide tools this is typically an integral part of the base body.

In the interior of the base body, surrounded by the outer shell, a support structure is further formed with at least one separating web which separates the plurality of recesses from each other. Therefore, in order to save material, instead of a single central recess, a plurality of recesses are formed, wherein the individual recesses are separated from one another by separating webs of a support structure. This configuration is based on the observation that the forces absorbed by the shaft can be taken up by the internal support structure, so that, in principle, the wall thickness of the outer shell can be kept low to save material. The inner support structure can therefore provide maximum material savings while at the same time providing sufficiently high mechanical stability.

In the simplest case, a central recess is divided by a transverse web into two sub-spaces. Preferably, however, more than two recesses are formed. To do this, the support structure is extended into the region of the clamping shank and can also be continued within the cutting element as cooling ducts, for example.

In order to achieve maximum stability, the support structure is preferably designed to be grid-like in cross section. This means that the individual separating webs viewed in cross section intersect or adjoin one another. The individual separating webs are typically designed as flat, plate-shaped struts. In a particularly expedient embodiment, the support structure in cross section is designed to be like a honeycomb overall. Viewed in cross section, the individual recesses thus form hexagonal sub-channels bounded by the separating webs. Such a honeycomb support structure has very high mechanical stability with only a minimal material requirement.

In an expedient embodiment, the outer shell is at least approximately annular and surrounds a centered central space. The central space is preferably circular in cross section and thus forms a cylindrical space. In principle, it is also possible for the central space to have a polygonal cross-section, that is, a multiangular (triangle, square, pentagon) cross-section. An annular outer shell is therefore generally understood to be an outer shell which has an inner contour that defines such a circular or polygonal inner cross-sectional area of the central space.

In a particularly expedient embodiment, the support structure is designed as a separate insert which is inserted into the central space. The insert is pressed or soldered into the central space, for example. When a base body configured as a sintered body is used, the insert is expediently inserted into the final sintered body after the actual sintering process. With such sintered bodies, in particular, simple production is possible because the main central space must be formed merely when producing the sintered body.

In addition, for this purpose it is provided in a preferred embodiment that the supporting structure is made of a different material from the material of the outer shell. In particular, the support structure is made of a softer material than the base body. The support structure consists of a simple tool steel or of plastic, for example. Due to the design as a support structure, a material distinctly softer than carbide can be used. In the area of the central space, therefore, only the outer shell is made of carbide.

Alternatively, the support structure is formed directly by the base body itself.

As stated above, the embodiment described herein is particularly advantageous for sintered bodies. However, this concept can basically be transferred to other tools.

It is expedient if the plurality of recesses in the clamping shank is at least partially continued in the cutting element in the axial direction. A number of recesses, that is, at least one or more recesses are therefore formed in the cutting element. Expediently, the total cross-sectional area of the recesses in the cutting element is less than the total cross-sectional area of the recesses in the clamping shaft. Since exterior flutes are usually incorporated into the cutting element, the material cross-section in the cutting element is already reduced, so that a sufficient cross-section of material must remain in the interior of the body to provide sufficient stability, in particular in the case of a drill or milling cutter for transmitting the required torque, for example.

For this purpose, the recesses in the cutting element are preferably designed as cooling ducts which extend to outlet holes at the tool tip. For spiral flutes, these coolant channels are preferably also designed as spirals. Alternatively, only one central coolant channel is formed, which adjoins a distribution structure in the region of the tool tip, in particular individual coolant bores that are directed radially outwardly.

Furthermore, it is expedient to ensure that the outer shell and the support structure in the region of the clamping shank have a material cross-sectional area approximately equal to the smallest cross-sectional area of material in the cutting part of the base body. This is based on the observation that it is sufficient if the clamping shaft has a material cross-sectional area sufficient to transmit the torque forces.

The object is further achieved by a method for producing such a cutting tool having the features of claim 9. The method is characterized in that a support structure is introduced into the outer shell of the base body so that numerous mutually separate recesses are formed.

For this purpose, according to a first variant, a centered central space surrounded by the outer shell is first introduced into a green body, into which then the support structure is introduced as a separate insert.

Preferably, the base body is formed as a sintered body, wherein a green body is first prepared and is then sintered. The green body is usually (carbide) metal powder, which, with the addition of a binder, is formed into an appropriate shape for the base body, for example by pressing. In the subsequent sintering process, this green body is sintered at high temperature.

According to the first variant, the centered central space is first introduced into the green body by drilling, for example; then the green body is sintered and only then is the insert that forms the support structure introduced, for example by pressing, soldering, weaving etc.

According to an alternative embodiment, the support structure is formed in the green body and this is then sintered. To do this, to introduce and form the support structure, the plurality of recesses is introduced into the green body which is initially formed as a solid material. This is preferably done by a simple drilling operation. Therefore, in the initial state of the green body, a plurality of individual bores is placed in the back of the clamping shaft. These, in turn, are surrounded by an outer shell which merges integrally and seamlessly into the individual separating webs that demarcate the holes from each other. In this case, the partitions are convexly or concavely curved, corresponding to the circular shape of the holes.

DESCRIPTION OF THE FIGURES

Embodiments of the invention are explained in more detail with reference to the figures. In each case, they show simplified representations.

In the figures, identical parts are designated with the same reference numerals.

DESCRIPTION OF EXEMPLARY EMBODIMENTS

Figure 1:
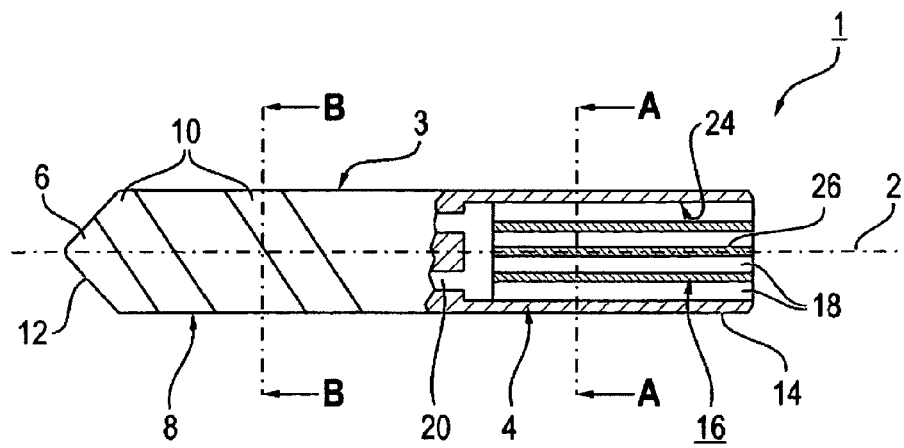
FIG. 1 is a partial sectional view of a solid carbide drill.

The cutting tool shown in FIG. 1 is designed as a solid carbide tool, particularly as a solid carbide drill. It is formed by an axially 2 extending monolithic sintered base body 3 running from a rear clamping shaft 4 to a front tool tip 6. In doing so, tool tip 6 bearing a cutting element 8 which is provided with flutes 10 adjoins the clamping shank 4. The entire cutting tool 1 as a whole is rod-shaped with a nominal diameter defined by frontal cutting edge 12.

In the region of the clamping shank 4, the cutting tool 1 has an outer shell 14 into which a support structure 16 is inserted. A plurality of recesses 18 is provided by the support structure 16; these are designed as channels extending in the axial direction 2. For this purpose, preferably substantially more than two recesses 18 are formed, for example, more than five.

On the supporting structure 16, which in the exemplary embodiment is formed exclusively in clamping shaft 4, recesses further designed as cooling ducts 20 connect in the cutting element 8. These preferably extend helically in each case in the intermediate region between the likewise helically extending flutes 10. They extend to the tool tip 6, where they exit through the front or into the respective flute 10.

Figure 2:
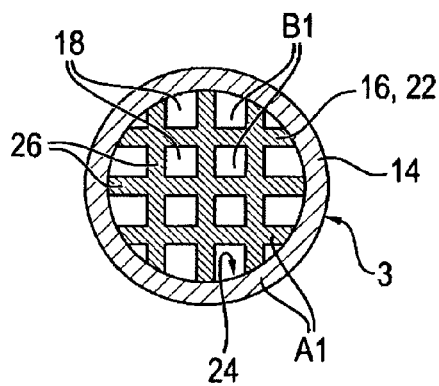
FIG. 2 is a sectional view in the region of cutting line A-A in FIG. 1 according to a first embodiment.

According to a first embodiment shown in FIG. 2 the support structure 16 is introduced as a separate insert 22 into a space 24 formed as a central bore. The support structure 16 is designed as a grid with a plurality of intersecting struts forming the separating webs 26.

Alternatively to the grid-like support structure 16, in a preferred alternative, said support structure is designed as a honeycomb-like support structure. The insert 22 is expediently formed of a material different from the material of the base body 3.

During the production of the base body 3, the central space 24 is introduced into a green body before it is sintered. After sintering, the insert 22 is inserted into the central space 24.

Figure 3:
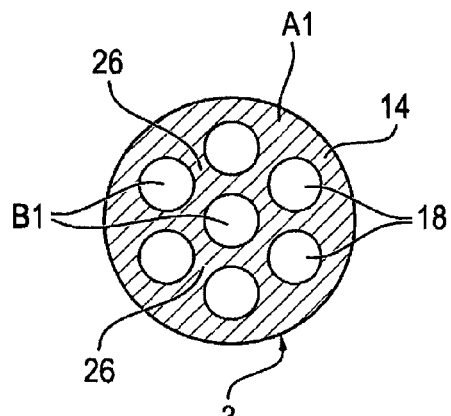
FIG. 3 is a sectional view taken along the cutting line A-A in FIG. 1 according to a second embodiment.
Figure 4:
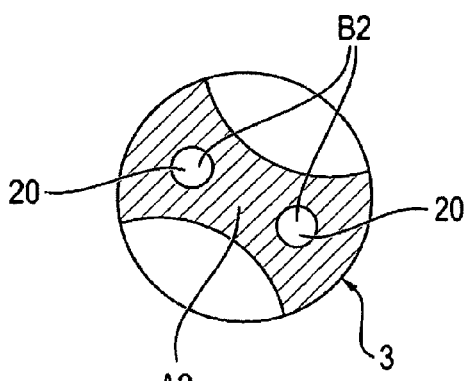
FIG. 4 is a sectional view along the cutting line B-B in FIG. 1.

Alternatively, in the embodiment of FIG. 3, the support structure 16 is already incorporated into the green body. To do this, the individual recesses 18 are placed as individual holes that are separated from one another by the separating web 26. The individual recesses 18 are therefore introduced into the green body by a drilling process before the sintering process is carried out. Again, the plurality of recesses 18 are surrounded by the outer shell 14. The separating webs 26 form a monolithic sintered body together with the outer shell 14.

In the area of the clamping shank 4, the outer shell together with the support structure 16 has a material cross-sectional area A1, which is preferably only as large as a corresponding smallest material cross-sectional area A2 in the cutting element 8. The material requirement is thus kept as low as possible.

Furthermore, overall the recesses 18 have a total cross-section B1 which is preferably larger than a corresponding total cross-section B2 in the cutting element 8.

Overall, by means of the measures described here, namely with the formation of the support structure 16 which is characterized by separating webs 26 by means of which a plurality of channel-like recesses 18 are formed, great reduction in material is achieved, particularly in solid carbide drills. At the same time, sufficient mechanical stability is ensured for receiving and transmitting the mechanical forces required in use, i.e., when drilling or milling, etc.

The invention claimed is:

1. A cutting tool, in particular a drill, comprising:
a base body extending in an axial direction from a rear clamping shaft at a rear end to a front tool tip at a front end, the base body having an outer shell with at least one inner recess extending axially, wherein within the recess defined by the outer shell a support structure is formed with at least one separating web by means of which a plurality of recesses are separated from each other,
wherein the plurality of recesses are channels extending in the axial direction, the channels extending through an entirety of the rear clamping shaft from the rear end to at least the front tool tip.

2. The cutting tool according to claim 1, wherein the support structure is grid-like when viewed in cross section.

3. The cutting tool according to claim 2, wherein the separating webs are flat, plate-shaped struts.

4. The cutting tool according to claim 3, wherein the cutting tool has a central longitudinal axis extending in the axial direction; and
wherein the flat, plate-shaped struts extend generally parallel to the central longitudinal axis of the cutting tool.

5. The cutting tool according to claim 1, wherein the outer shell is approximately annular and surrounds at least one centered central space.

6. The cutting tool according to claim 1, wherein the supporting structure is designed as a separate insert.

7. The cutting tool according to claim 1, wherein the supporting structure is formed of a material that is different from the material of the outer shell.

8. The cutting tool according to claim 1, wherein the base body is a sintered body.

9. The cutting tool according to claim 1, wherein at least a plurality of the recesses are continued in the front tool tip in the axial direction and a total cross-sectional area of the recesses in the front tool tip is less than a total cross-sectional area of the recesses in the rear clamping shaft.

10. The cutting tool according to claim 1, wherein the outer shell and the support structure in the rear clamping shaft have a material cross-sectional area which corresponds approximately to the smallest material cross-sectional area of the base body in the cutting front tool tip.

* * * * *